(12) United States Patent
    Cottin

(10) Patent No.: US 10,859,132 B2
(45) Date of Patent: Dec. 8, 2020

(54) BOGIE FOR A RAILWAY VEHICLE COMPRISING A THREE DISCS BRAKE SYSTEM ARRANGED BETWEEN AXLE BOXES

(71) Applicant: Alstom Transport Technologies, Saint-Ouen (FR)

(72) Inventor: Fabrice Cottin, Saint Firmin (FR)

(73) Assignee: Alstom Transport Technologies, Saint-Ouen (FR)

( * ) Notice: Subject to any disclaimer, the term of this patent is extended or adjusted under 35 U.S.C. 154(b) by 250 days.

(21) Appl. No.: 15/877,604

(22) Filed: Jan. 23, 2018

(65) Prior Publication Data
   US 2018/0209494 A1   Jul. 26, 2018

(30) Foreign Application Priority Data

Jan. 24, 2017   (FR) ...................................... 17 50571

(51) Int. Cl.
   | | |
   |---|---|
   | *B61H 5/00* | (2006.01) |
   | *F16D 55/224* | (2006.01) |
   | *B61F 3/02* | (2006.01) |
   | *B61H 13/36* | (2006.01) |

(52) U.S. Cl.
   CPC ............ *F16D 55/2245* (2013.01); *B61F 3/02* (2013.01); *B61H 5/00* (2013.01); *B61H 13/36* (2013.01)

(58) Field of Classification Search
   CPC ..... B61F 1/00; B61F 1/08; B61H 5/00; B61H 13/00; B61H 13/005; B61H 13/34
   See application file for complete search history.

(56) References Cited

U.S. PATENT DOCUMENTS

| | | | |
   |---|---|---|---|
   | 2,673,623 A | 3/1954 | Coombes | |
   | 2016/0257318 A1* | 9/2016 | Kuter | ...................... F16D 57/00 |

FOREIGN PATENT DOCUMENTS

| | | |
   |---|---|---|
   | DE | 19821688 A1 | 11/1999 |
   | WO | 2015071254 A1 | 5/2015 |

OTHER PUBLICATIONS

Search Report dated Oct. 11, 2017 during the persecution of French Patent Application No. 1750571.

* cited by examiner

*Primary Examiner* — Robert J McCarry, Jr.
   (74) *Attorney, Agent, or Firm* — Troutman Pepper Hamilton Sanders LLP

(57) ABSTRACT

The bogie for a railway vehicle comprises a chassis; an axle mounted rotatably relative to the chassis around a transverse rotation axis, at least one wheel being mounted on each of the transverse end parts of said axle, a braking system comprising three brake discs mounted around the axle, arranged in the space defined between the wheels, and three brake forks acting on a brake disc, comprising a pair of arms extending between first and second ends, the second ends each bearing a brake pad forming a pair of brake pads, each of the pairs of brake pads being positioned around part of a brake disc, and two successive pairs of brake pads extending on either side of the rotation axis. The first ends of the arms all extend on a same side of the rotation axis.

12 Claims, 3 Drawing Sheets

BOGIE FOR A RAILWAY VEHICLE COMPRISING A THREE DISCS BRAKE SYSTEM ARRANGED BETWEEN AXLE BOXES

CROSS-REFERENCE TO RELATED APPLICATION

This application is based upon and claims the benefit of priority of the prior French Patent Application No. 1750571, filed on Jan. 24, 2017, the entire contents of which are incorporated herein by reference.

FIELD OF THE INVENTION

The present invention relates to a bogie for a railway vehicle, comprising:
- a chassis extending in a longitudinal direction;
- at least one axle extending in a transverse direction and mounted rotatably relative to the chassis around a transverse rotation axis, at least one wheel being mounted on each of the transverse end parts of said axle,
- a braking system comprising at least three brake discs mounted around the axle, arranged in the space defined between the wheels, and at least three brake forks each acting on one of said brake discs, each brake fork comprising a pair of arms each extending between a first end and a second end, the second ends each bearing a brake pad forming a pair of brake pads with the brake pad of the other arm of said pair of arms, each of the pairs of brake pads being positioned around part of one of said brake discs, and two successive pairs of brake pads in the transverse direction extending on either side of the transverse rotation axis of the axle.

The invention applies to any type of railway vehicle, but is more particularly suitable for high-speed trains, for example provided to travel up to speeds exceeding 250 km/h.

DESCRIPTION OF RELATED ART

In light of the operating speeds of these trains, it is necessary to provide a disc brake system that is particularly adapted to these types of trains, comprising at least three brake discs, so as to obtain good braking performance. This type of braking system further includes, for each brake disc, a brake fork whose arms pass around the brake disc so as to act on the faces of the disc during braking.

In the case of a bogie "with internal axle boxes", i.e., the configuration in which the axle boxes are mounted on the axle between the two wheels, the remaining available space between the axle boxes does not allow the mounting of such a disc brake system comprising at least three brake discs, in light of the bulk of the brake forks. Indeed, during the mounting of the brake system, it is necessary to provide sufficient displacement between the arms of two adjacent forks so as to allow them to be separated without overlapping or interfering with one another in the transverse direction.

It is then known to adapt the brake disc on each wheel and to mount a brake disc on the axle between the two wheels. This solution leaves space available on the axle to integrate the axle boxes therein between the two wheels.

However, in order to be able to integrate actuators therein, such as forks, acting on the brake discs mounted on the wheels, it is necessary to offset the axle boxes toward the inside of the axle. However, such an offset of the axle boxes raises design problems in the primary suspension, in particular related to the rolling stiffness.

Furthermore, this solution also involves using different forks and/or a different arrangement of forks for the brake discs mounted on the wheels and for the disc arranged on the axle between the two wheels.

Lastly, this solution is not fully satisfactory because it is a cumbersome solution and this solution is expensive to purchase, as are its spare parts.

BRIEF SUMMARY OF THE INVENTION

One of the aims of the invention is to offset these drawbacks by proposing a bogie comprising at least three brake discs and corresponding forks, in particular identical, mounted on the axle between the wheels and allowing integration of the axle boxes at a transverse end of the axle between the two wheels and the end brake discs.

To that end, the invention relates to a bogie of the aforementioned type, in which the first ends of the arms all extend on a same side of the rotation axis of the axle.

It will be understood that the forks extend in pairs in alternately different parallel planes, and on either side of the rotation axis of the axle. These planes can be planes parallel to the longitudinal direction or planes perpendicular to the longitudinal direction.

It will then be understood that, because two consecutive forks extend along different axes, it is possible to bring the brake discs equipped with brake forks closer to the center of the axle, while avoiding an overlap or interference of the arms of the forks with one another.

Owing to these arrangements, the compactness of the brake device is increased, which makes it possible to leave sufficient space at the free ends of the axle to integrate a axle box between a wheel and a brake disc.

This consequently increases the compactness of the chassis according to the invention.

According to other features of the bogie according to the invention:
- said bogie comprises two axles and the first ends of the arms are positioned between the two axles;
- each pair of brake pads is arranged to grip a central brake disc surface of a brake disc, extending around the transverse rotation axis of the axle;
- the first ends of a pair of arms are connected to one another by a piston making it possible to vary the separation between the arms of a pair of arms between an active braking position in which the pair of brake pads grips the central brake disc surface of the brake disc and an inactive position in which the pair of brake pads is separated from the brake disc;
- at least some of the arms are facing each other in a plane perpendicular to the transverse rotation axis;
- the brake forks are fastened to a crosspiece secured to the chassis extending transversely to the chassis;
- two adjacent brake forks are fastened to the crosspiece at different heights;
- said bogie comprises at least one axle box mounted on a transverse end of the axle, between a wheel and a brake disc, the axle being rotatable in the axle box; and
- said bogie comprises at least two axle boxes, each axle box being mounted on a transverse end of the axle, between a wheel and a brake disc.

The invention further relates to a railway vehicle comprising the bogie described above.

BRIEF DESCRIPTION OF THE SEVERAL VIEWS OF THE DRAWINGS

Other aspects and advantages of the invention will appear upon reading the following description, provided as an example, and done in reference to the appended drawings, in which.

DETAILED DESCRIPTION OF THE INVENTION

In the description, the term "longitudinal" is defined relative to the direction of travel of a railway vehicle on rails. The term "transverse" is defined in a direction perpendicular to the longitudinal direction and corresponds to the direction in which the rails are spaced apart. The term "elevation" is defined in a direction perpendicular to the longitudinal direction and the transverse direction. When the railway vehicle travels on horizontal rails, the longitudinal and transverse directions are substantially horizontal, and the elevation direction is substantially vertical. The terms "below", "above", "top" and "bottom" are defined relative to the elevation direction.

Figure 1:
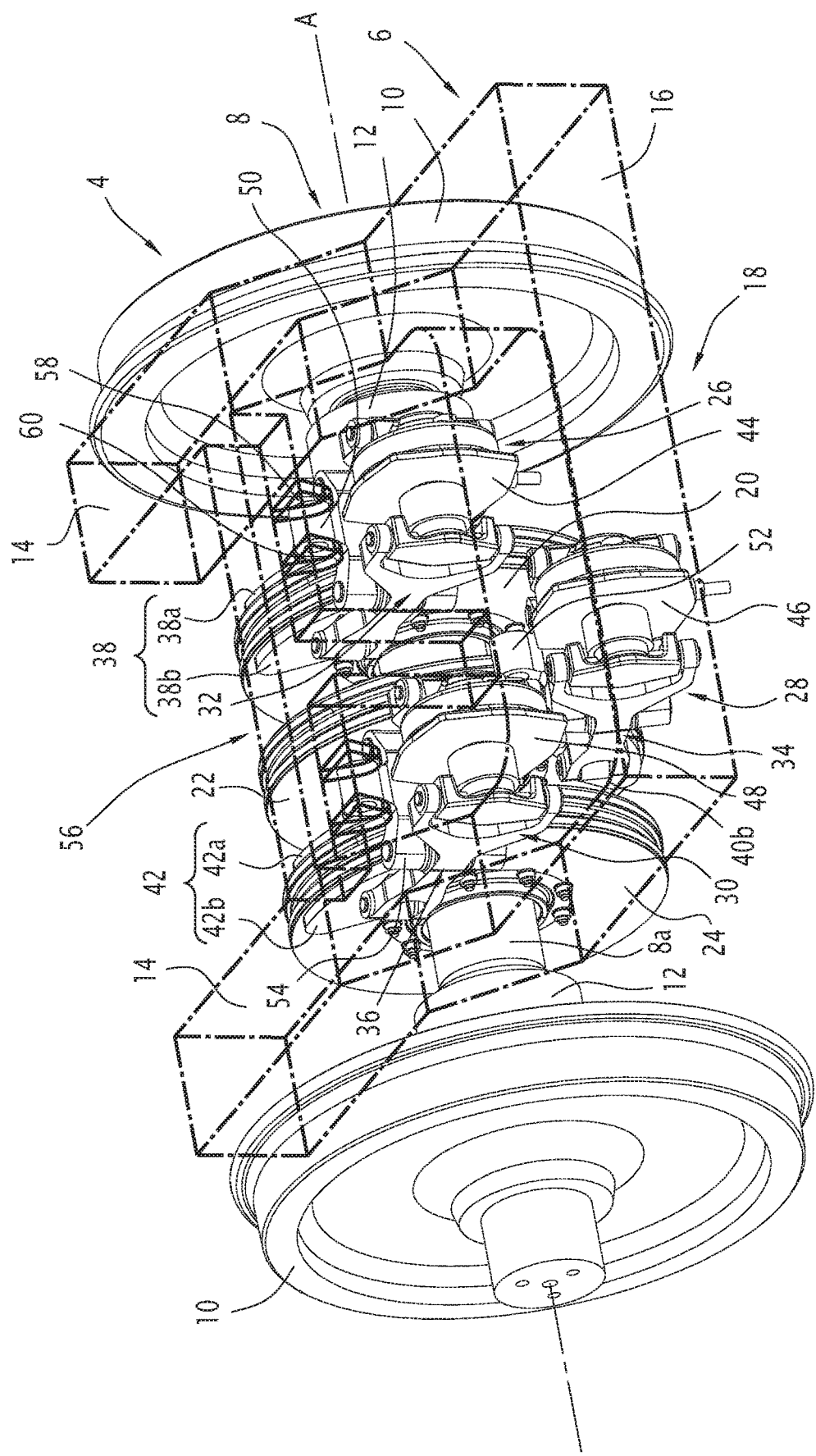
FIG. 1 is a perspective view of one end of a bogie comprising a braking system according to the invention.

In reference to FIG. 1, a railway vehicle 4 is defined comprising a chassis 6 extending primarily substantially in the longitudinal direction and bearing, at each of its longitudinal end parts, an axle 8 extending substantially in a transverse direction. Each axle 8 is mounted rotating on a transverse rotation axis A.

Each of the axles 8 includes a shaft 8a extending transversely and two wheels 10 fastened to the transverse end parts of the shaft 8a and secured in rotation therewith.

Furthermore, each axle 8 is mounted rotating in two axle boxes 12 or pair of axle boxes extending around the axle 8, between the two wheels 10. Each axle box 12 is formed by a molded body comprising a transverse axis orifice, for example provided with rolling bearings, inside which the axle 8 is mounted rotating.

According to the embodiment of FIG. 1, the chassis 6 comprises two stringers 14 extending substantially longitudinally, only part of which is shown in FIG. 1. Each stringer 14 connects one of the axle boxes 12 of a pair to one of the axle boxes of the other pair of axle boxes 12. The stringers 14 are for example connected to one another by two crosspieces 16 extending substantially transversely. A single crosspiece 16 is shown in FIG. 1.

The bogie 4 further comprises a braking system 18 that will be described below, mounted around each axle 8.

This particular bogie structure is provided solely as an example, and other structures could be considered.

Thus, alternatively, each wheel 10 could be mounted rotatably in an axle box 12 independently of the others. The bogie 4 could comprise more than two stringers, for example articulated to one another. Furthermore, the stringers 14 could be connected to one another by a central crosspiece.

The wheels 10 have been shown as extending outside the bogie 4, but they could be positioned inside.

The chassis 6 could be formed by two half-chassis articulated to one another and each bearing one of the axles 8 of the bogie 4.

The bogie 4 may or may not be motorized, i.e., it may or may not comprise one or several motors for rotating a or the axle(s) 8 of the bogie 4.

Figure 2:
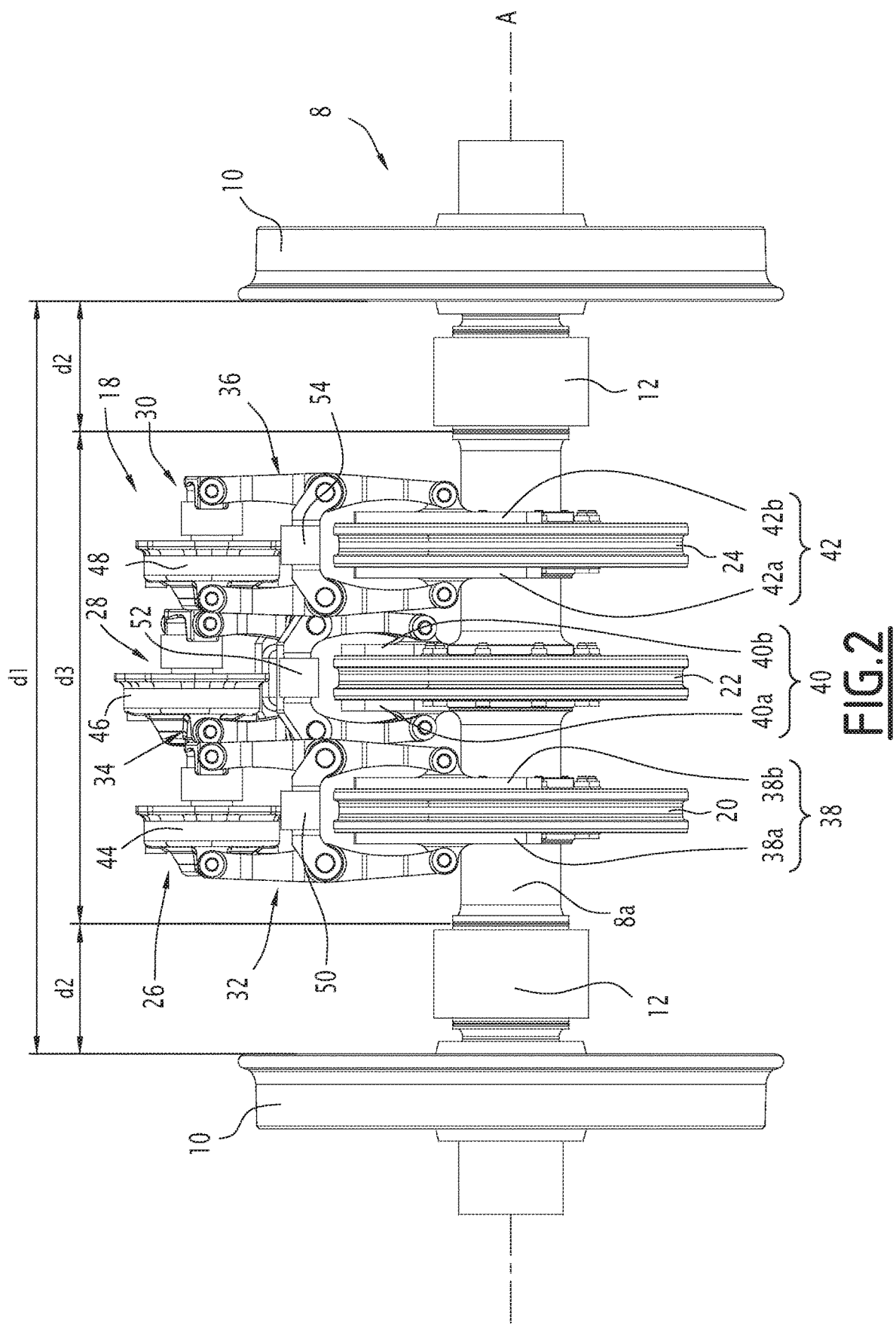
FIG. 2 is a top view of an axle and the braking system of the bogie of FIG. 1.

As shown in FIG. 2, the space between the two wheels 10 has a transverse bulk d1 substantially equal to 1360 millimeters (mm). Furthermore, each axle box 12 has a transverse bulk d2 substantially equal to 280 mm. Thus, the space available at the center of the axle 8, so as to incorporate the braking system 18, has a length d3 substantially equal to 800 mm.

The braking system 18 according to the invention is suitable for being integrated into the space delimited between the two axle boxes 12, defined in FIG. 2 by the transverse bulk d3.

In the rest of the description, only the relationship between one axle 8, two axle boxes 12 and a braking system 18 will be described, this relationship being identical for all of the other axles and axle boxes 12 of the bogie 4.

Figure 3:
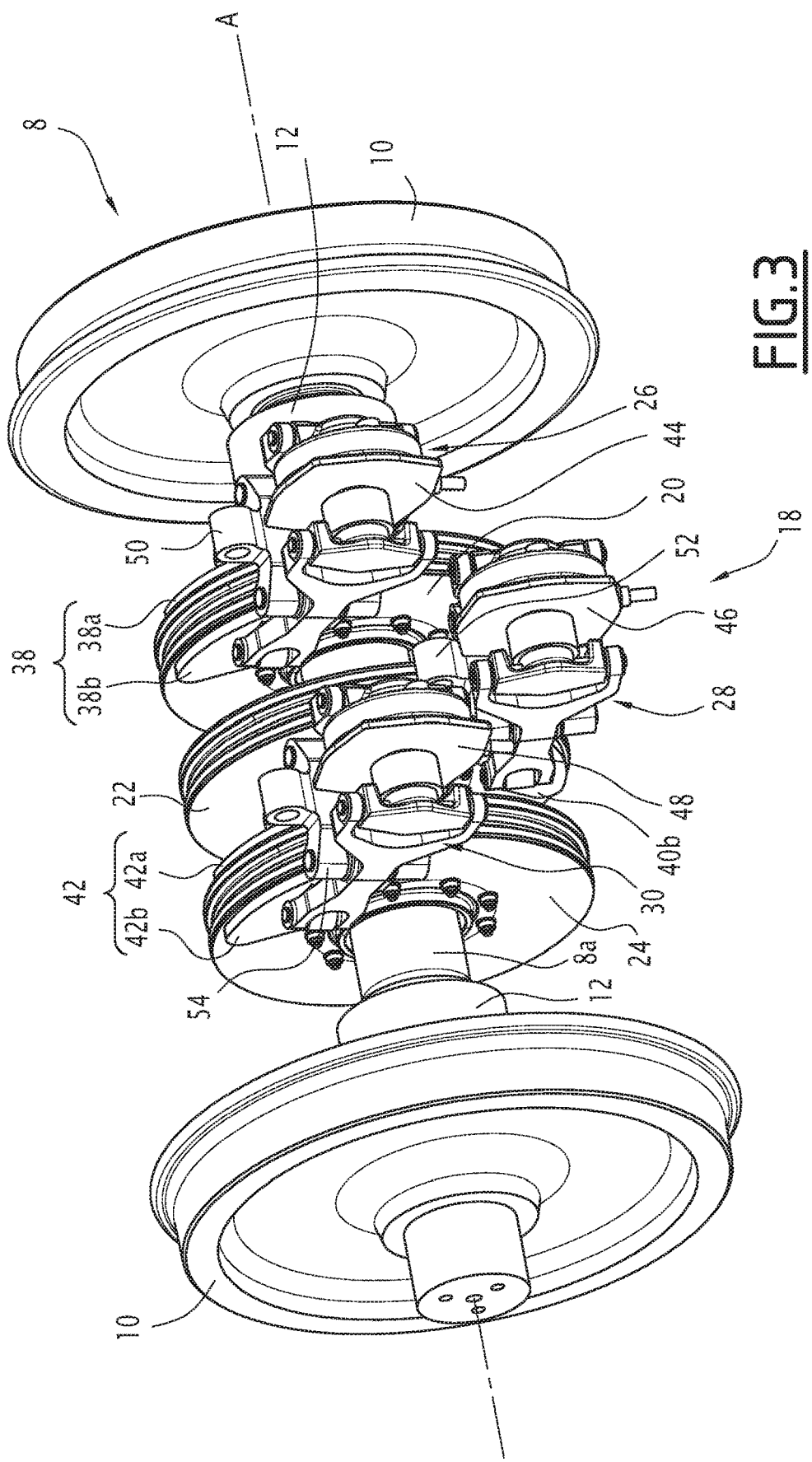
FIG. 3 is a perspective view of FIG. 2.

In relation to FIGS. 1 to 3, the braking system 18 mounted around the axle 8 is described.

The braking system 18 includes at least three brake discs 20, 22, 24 mounted around the axle 8, and more particularly around the shaft 8a of the axle 8, in the space defined between the two wheels 10.

The braking system 18 further includes three brake forks 26, 28, 30 respectively acting on the brake discs 20, 22, 24. In particular, the brake discs 20, 22, 24 are arranged in the space defined between the two axle boxes 12.

Thus, each axle box 12 is mounted on a transverse end of the axle 8 between a wheel 10 and a brake disc 20, 24, the axle 8 being rotatable in the axle boxes 12.

Each brake fork 26, 28, 30 comprises a pair of arms 32, 34, 36 each extending between a first end and a second end, the second ends each bearing a brake pad 38a, 38b, 40a, 40b, 42a, 42b forming pairs of brake pads 38, 40, 42. Thus, each brake fork 26, 28, 30 comprises two arms and two brake pads each carried by the second end of the arms.

The first ends of each of the pairs of arms 32, 34, 36 are connected to an actuating device, in this example a piston 44, 46, 48, making it possible to vary the separation between the arms of a pair of arms 32, 34, 36, between an active braking position in which the pair of brake pads 38, 40, 42 is pressed against and grips part of the brake disc 20, 22, 24, and an inactive position in which the pair of brake pads 38, 40, 42 is separated from the brake disc 20, 22, 24.

In the figures, the pairs of arms 32, 34, 36 are in the active braking position. In this position, the brake forks 26, 28, 30 brake the rotation of the axle 8, and consequently brake the bogie 4.

The brake forks 26, 28, 30 comprise, in a manner known in itself, brake brackets 50, 52, 54 suitable for supporting the arms of a pair of arms 32, 34, 36.

The brake pads 38a, 38b, 40a, 40b, 42a, 42b are arranged to grip a central brake disc surface 20, 22, 24, extending around the rotation axis A. FIGS. 1 and 3 in particular show the pairs of pads 38 and 42 that respectively grip the central surfaces of the brake discs 20 and 24, extending around the rotation axis A. These figures also show the brake pad 40b that grips a central surface of the brake disc 22. The central surfaces of a brake disc 20, 22, 24 are for example substantially facing each other relative to a plane perpendicular to the rotation axis A, respectively passing through the brake disc 20, 22, 24.

In order to allow the brake system 18 to be mounted in the space delimited between the two axle boxes 12, defined in FIG. 2 by the transverse bulk d3, two successive pairs of pads 38 and 40, and 40 and 42 in the transverse direction, extend on either side of the rotation axis A in the elevation direction.

As shown in more detail in the figures, the successive pairs of pads 38, 40 and 42 are alternately positioned on either side of the rotation axis A in the elevation direction.

In this particular example, the pairs of brake pads 38, 40, 42 are alternately positioned below and above the rotation axis A.

According to this embodiment, the braking system 18 extends in the longitudinal direction.

More specifically, the first pair of pads 38 is positioned above the rotation axis A and grips a central surface of the brake disc 20 situated above the axis A. The second pair of pads 40, which follows the first pair of pads 38 in the transverse direction, is positioned below the rotation axis A, and grips a central surface of the brake disc 22 situated below the rotation axis A. The third pair of pads 42, which follows the second pair 40 in the transverse direction, is positioned above the rotation axis A and grips a central surface of the brake disc 24 situated above the rotation axis A.

Furthermore, each of the first ends of all of the arms extend on a same side of the rotation axis A. Likewise, the pistons 44, 46, 48 to which the first ends of the arms are attached all extend on a same side of the rotation axis A. For example, the first ends of the arms extend between the two axles 8 of the bogie 4. In other words, the first ends of the arms extend inside the chassis 6.

Thus, the arms associated with the brake pads 38b and 40a, and the arms associated with the brake pads 40b and 42a, extend across from one another in a plane perpendicular to the rotation axis A.

As shown by FIG. 1, the chassis 6 includes a mounting beam 56 or crosspiece for mounting the brake forks 26, 28, 30 of the braking system 18 in the bogie 4.

In this example, the beam 56 is substantially T-shaped. The beam 56 includes a first beam portion extending substantially transversely between the stringers 14, and a second beam portion extending substantially in the elevation direction, downward, from the center of the first beam portion. The beam 56 is fastened by its distal ends to the stringers 14 of the chassis 6.

The brake forks 26, 28, 30 are mounted on the mounting beam 56. More particularly, the brake forks 26, 28, 30 are mounted on an inner face of the mounting beam 56, via a fastening device. The fastening device comprises, for each brake fork 26, 28, 30, two mounting tabs, secured to an upper portion of a brake bracket 50, 52, 54 and a lower face of the beam 56. The mounting tabs associated with the fork 26 are identified in FIG. 1 by references 58 and 60. Other types of fastening system may of course be suitable.

In particular, in this example, the adjacent brake forks 26 and 28, and 28 and 30, are fastened to the beam 56 at different heights. Indeed, the brake fork 28 is fastened below the brake forks 26 and 30 in the elevation direction.

The braking system 18 according to the invention described above is more compact than the known braking systems.

It is then possible to incorporate the two axle boxes 12 and the braking system 18 into the space between the two wheels 10, and thus to obtain a more compact bogie.

In one alternative of the embodiment described above, the arrangement of the pairs of pads 38, 40, 42 is reversed.

In this alternative, the end pairs of brake pads 38, 42 are positioned below the rotation axis A and respectively grip the central surfaces of the brake discs 20 and 24 situated below the rotation axis A, and the pair of pads 40, inserted between the end pairs of pads 38, 42, is positioned above the rotation axis A and grips a central surface of the brake disc 22 situated above the rotation axis A.

In another embodiment not shown in the figures, the braking system 18 extends in the elevation direction, and the pairs of arms 32, 34, 36 extend in the elevation direction.

In this embodiment, the pairs of brake pads 38, 40, 42 and the corresponding braking surfaces of the brake discs 20, 22, 24 are alternately positioned on one side, then another side of the rotation axis A, in the longitudinal direction. In this example, the pairs of brake pads 38, 40, 42 are alternately positioned outside and inside the chassis 6.

More specifically, the first pair of pads 38 is positioned on one side of the rotation axis A and grips a central surface of the brake disc 20 situated outside the chassis 6. The second pair of pads 40 that follows the first pair of pads 38 in the transverse direction is positioned on another side of the rotation axis, and grips a central surface of the brake disc 22 situated inside the chassis. The third pair of pads 42 that follows the second pair 40, in the transverse direction, is positioned on the same side of the rotation axis A as the first pair of brake pads 38 and grips a central surface of the brake disc situated outside the chassis.

For example, the pairs of arms 32, 34, 36 are all positioned above the rotation axis A.

The invention claimed is:

1. A bogie for a railway vehicle, comprising:
a chassis extending in a longitudinal direction;
at least one axle extending in a transverse direction and mounted rotatably relative to the chassis around a transverse rotation axis, at least one wheel being mounted on each of the transverse end parts of said axle,
a braking system comprising at least three brake discs mounted around the axle, arranged in the space defined between the wheels, and at least three brake forks each acting on one of said brake discs, each brake fork comprising a pair of arms each extending between a first end and a second end, the second ends each bearing a brake pad forming a pair of brake pads with the brake pad of the other arm of said pair of arms, each of the pairs of brake pads being positioned around part of one of said brake discs, and, for said axle, two successive pairs of brake pads extending on opposite lateral sides across said transverse rotation axis of said axle in a first direction perpendicular to said transverse rotation axis,
wherein the first ends of the arms all extend on a same side of said transverse rotation axis along a second direction perpendicular to said transverse rotation axis, said second direction being distinct from the first direction.

2. The bogie according to claim 1, comprising two axles and wherein the first ends of the arms are positioned between the two axles.

3. The bogie according to claim 1, wherein each pair of brake pads is arranged to grip a central brake disc surface of a brake disc, extending around the transverse rotation axis of the axle.

4. The bogie according to claim 3, wherein the first ends of a pair of arms are connected to one another by a piston making it possible to vary the separation between the arms of a pair of arms between an active braking position in which the pair of brake pads grips the central brake disc surface of the brake disc and an inactive position in which the pair of brake pads is separated from the brake disc.

5. The bogie according to claim 1, wherein at least some of the arms are facing each other in a plane perpendicular to the transverse rotation axis.

6. The bogie according to claim 1, wherein the brake forks are fastened to a crosspiece secured to the chassis extending transversely to the chassis.

7. The bogie according to claim 6, wherein two adjacent brake forks are fastened to the crosspiece at different heights.

8. The bogie according to claim 1, comprising at least one axle box mounted on a transverse end of the axle, between a wheel and a brake disc, the axle being rotatable in the axle box.

9. The bogie according to claim 8, comprising at least two axle boxes, each axle box being mounted on a transverse end of the axle, between a wheel and a brake disc.

10. A railway vehicle comprising at least one bogie according to claim 1.

11. The bogie according to claim 1, wherein the first direction is an elevation direction perpendicular to said transverse rotation axis and to said longitudinal direction and the second direction is parallel the longitudinal direction.

12. The bogie according to claim 1, wherein the two successive pairs of brake pads include a first pair of brake pads extending in a first direction along an elevation axis, and a second pair of brake pads extending in an opposite direction along the elevation axis, and wherein the elevation axis is perpendicular with respect to the transverse rotation axis.

* * * * *